Dec. 5, 1944.   C. S. FULLER   2,364,204
HEAT-OXYGEN TREATED POLYAMIDES
Filed March 28, 1941
HEAT OXYGEN TREATED
POLYAMIDE COATING
COPPER WIRE
INVENTOR
C. S. FULLER
BY
ATTORNEY Patented Dec. 5, 1944

2,364,204

UNITED STATES PATENT OFFICE 2,364,204

HEAT-OXYGEN TREATED POLYAMIDES

Calvin S. Fuller, Chatham, N. J., assignor to Bell Telephone Laboratories, Incorporated, New York, N. Y., a corporation of New York Application March 28, 1941, Serial No. 385,648

18 Claims. (Cl. 260—78)

This invention relates to new compositions of matter and methods of preparing them, and to articles embodying such compositions and methods of producing such articles. More particularly, the present invention relates to improved linear polyamides, to articles embodying such polyamides, and to methods of producing such improved polyamides and articles.

Linear polyamides of the type improved by the present invention have been heretofore disclosed, for instance, in Patent 2,071,251 to W. H. Carothers. Such polyamides are produced by condensation of suitable bifunctional amide-forming reactants which will react to form linear molecules. Thus, such a polyamide may be formed by condensing a single monocarboxylic monoamino acid, by condensing two or more of such acids in the desired proportions, by condensing one or more dicarboxylic acids and one or more diamines in the proper proportions, or by condensing equivalents of such substances. The reaction is carried out under conditions such that linear molecules of high molecular weight are obtained.

Linear polyamides of the type improved by the present invention may be of different degrees of crystallinity, ranging from polyamides which are substantially amorphous or non-crystalline at room temperatures to those which are substantially crystalline at such temperatures. The degree of crystallinity depends upon the nature of the chemical repeating unit or units making up the l'near molecules of the polyamide. Such polyamides may be classified as substantially crystalline polyamides, i. e., those which are predominantly crystalline at room temperatures and have fairly definite melting points substantially above room temperatures; and substantially non-crystalline polyamides, i. e., those which are predominantly or entirely amorphous at room temperatures. Linear polyamides which are substantially crystalline at room temperatures and which have fairly definite melting points substantially above room temperatures have properties such as toughness, flexibility and tensile strength rendering them useful for various purposes. It has, for example, been proposed to form such polyamides into filaments useful for textiles or other purposes, to employ such polyamides in the formation of films or coatings, etc. In general, the desirable properties of such crystalline linear polyamides are associated with fairly high molecular weights and particularly with molecular weights high enough to permit cold drawing of the polyamides.

When initially solidified, such a crystalline linear polyamide appears to consist of haphazardly disposed micro-crystals associated with amorphous material of the same chemical composition which serves as a matrix and lends toughness and flexibility to the polyamide. When such a polyamide is cold drawn or linearly stressed at room or even at somewhat elevated temperatures the crystals and molecules become oriented in the direction of stress, as a result of which the strength, toughness and elasticity of the polyamide in the direction of stress are improved.

Such crystalline linear polyamides are, however, readily fusible and when heated above their melting points soften or melt, becoming deformable and losing their desirable properties, such as strength and toughness. Moreover, since the melting points of such crystalline polyamides are often relatively low in comparison to temperatures to which it may be desirable to subject them in use, the disadvantage occurs that they cannot be employed under conditions where they are subjected to more than moderate temperatures, or else the polyamides will either melt or soften and deform.

If such crystalline linear polyamides are aged by being heated below their melting points, particularly for prolonged periods, they become brittle and lose their elasticity and flexibility. Often, indeed, such embrittlement and loss of elasticity and flexibilty arise upon mere aging of the material at ordinary temperatures, particularly in sunlight. These undesirable effects apparently are caused by crystal growth, particularly under the influence of heat, into the amorphous regions of the polyamide structure so that eventually the solid polyamide becomes substantially entirely crystalline in structure and contains practically no amorphous material which can lend toughness and flexibilty to the material.

It has been proposed to employ certain of such prior linear crystalline polyamides for electrical insulation purposes because of the good electrical insulation and moisture resistance properties of such polyamides. For example, such polyamides may be employed as films or coatings for conductors or as impregnants for textile or paper insulation on conductors. However, the above-mentioned tendencies toward embrittlement and reduction of flexibility of such polyamides on heating or aging may provide considerable disadvantages when the polyamides are employed in electrical insulation, since such tendencies may cause such polyamides to crack and lose adhesion to their supporting means, such as the wire, with a resultant peeling and loss of moisture-proofing and insulating properties. The fusibility of such materials may also be disadvantageous when they are employed in electrical insulation, since heating of a conductor during use may melt or cause deformation of the insulating polyamide to such a degree that it fails to perform its protective insulating function.

Linear polyamides which are substantially noncrystalline in nature or which have a low degree of crystallinity may be liquids or solids of the nature of glasses, at room temperatures. In general, the liquids heretofore have been found to solidify only with difficulty, if at all, and hence have been heretofore found to be of little or no use. The more solid polyamides of low crystallinity are usually brittle glasses, or tend to become brittle on aging at ordinary or elevated temperatures, wherefore their uses have been limited. Such polyamides all soften and eventually liquify as their temperatures are raised. The temperatures at which such polyamides liquify or harmfully soften frequently are not high. The uses to which such substantially non-crystalline polyamides may be put are therefore limited by these factors.

Such difficulties heretofore encountered with polyamides are overcome by the present invention according to which a suitable linear polyamide, which may be of any one of the above-indicated degrees of crystallinity, embodying long-chain molecules is heated for a short period to a relatively high temperature in the presence of oxygen. Exposure of a substantially crystalline linear polyamide to heat in the presence of oxygen according to the present invention results in an increase in the toughness and flexibility of the polymer and increased resistance to, if not entire elimination of, the tendency to become brittle and inflexible upon aging at ordinary temperatures or upon prolonged heating below the melting point. By such treatment, moreover, the material may be rendered substantially, if not entirely, infusible and insoluble, at least in ordinary solvents. When the polyamide is employed as a coating or the like its adherence to its supporting surface is also greatly improved. By heat-oxygen treatment according to the present invention it is also possible to obtain from substantially non-crystalline linear polyamides or linear polyamides of a low degree of crystallinity flexible, tough, rubber-like materials, which may advantageously be produced in the form of films or coatings. Such rubber-like materials are substantially infusible and insoluble.

Polyamides treated according to the present invention may advantageously be employed for electrical insulation as, for example, for coating conductors under suitable conditions, or for impregnating suitable insulating material on conductors. The improved material of the present invention, when so employed, is highly flexible, tough, abrasion resistant, does not tend to become brittle or inflexible upon aging or heating, is substantially infusible and hence not deformable when exposed to heat, and has extremely good adhesion to the conductor or material covered with it or impregnated with it.

This aspect of the invention will be hereinafter discussed in connection with the accompanying drawing which illustrates a portion of a conductor coated with a linear polyamide embodying the present invention.

The heat-oxygen treatment of linear polyamides to obtain the products of the present invention is advantageously performed by subjecting a suitable polyamide to heat of suitable intensity and to gaseous oxygen while the polyamide is in the liquid state and in a mass of thin cross-section. The gaseous oxygen may advantageously be that of the air, and the polyamide may be in the liquid state either because it is at a temperature above its melting point or because it is dissolved or because of a combination of these factors.

The heat to which the polyamide is subjected is of such intensity, both from the standpoint of temperature and from that of duration, that a change occurs in the structure of the polyamide which renders the polyamide substantially infusible and insoluble, and which greatly improves its toughness, flexibility, adhesion, and resistance to aging. In general, temperatures between about 125° C. and about 450° C. are employed, depending upon the kind of polyamide being treated.

In the case of a polyamide which is a substantially crystalline solid at room temperatures, the temperature to which the polyamide is heated during the heat-oxygen treatment is above the melting point of the polyamide. Advantageously, it is considerably higher than the melting point. While the temperature of heating of such a substantially crystalline polyamide is determined by the melting point and structure of the polyamide, the temperatures employed in the practice of the invention lie between about 250° C. and about 450° C., being in each case above the melting point of the polyamide being heated. From the standpoint of the desirable results obtained, it is particularly advantageous to employ temperatures lying between about 325° C. and about 450° C.

If the polyamide is of the non-crystalline type, i. e., is originally liquid or plastic at room temperatures, the heat should be of such intensity that the polyamide is transformed into a tough, rubber-like mass which is substantially infusible and insoluble. In this case, too, the intensity of the heat to which the polyamide should be subjected is dependent upon the structure of the polyamide, and in the practice of the present invention such polyamides are heated to temperatures lying between about 125° C. and about 450° C. until the desired structural changes occur.

The intensity of heating of a suitable linear polyamide, according to the present invention, should, however, not be so great as to cause harmful decomposition of the polyamide. Such decomposition involves breaking of the linear molecular chains through oxidation or thermal splitting. While the point of incipient decomposition is reached and apparently passed so that some decomposition occurs, the heating should be such that not more than a small amount of decomposition takes place, and in any event such that the material is not harmfully decomposed.

In the practice of the invention the time of heating is for this reason short, being a matter of a few minutes at the most. In most cases, particularly in the heat-oxygen treatments of substantially crystalline polyamides in which relatively high temperatures are employed, the time during which the polyamide is subjected to the maximum heat is in the neighborhood of one minute or less.

A measure of the intensity of the heat-oxygen treatment to which the polyamide is subjected according to the present invention, is afforded by the color of the treated polyamide. As the polyamide is subjected to treatment of increasing intensity, its color changes to yellow, then to brown, then to red-brown, then to dark red, and finally to black. In the case of a polyamide which is originally white or light colored, the structure of the polyamide is not changed sufficiently to provide improved characteristics according to the invention unless the polyamide has been subjected to a heat-oxygen treatment of sufficient intensity to change its color to a pronounced yellow. It is still more advantageous from the standpoint of desirable properties to subject the polyamide to a heat-oxygen treatment until its color is brown to reddish-brown. A black color generally indicates that the polymer has been overtreated and that too great an amount of decomposition has occurred.

A sufficient amount of oxygen, in general an excess, is employed to provide the desired changes in the structure of the polyamide at the heat intensity employed. When the polyamide is dissolved in a solvent and exposed to heat and the oxygen of the air, the solvent is evaporated by the heat and dilutes the oxygen in the air. In such a case sufficient air must be supplied to insure an ample supply of oxygen for the reaction, particularly if the polyamide is heated in an enclosure, such as an oven. Usually at least one per cent by volume of the atmosphere surrounding the polyamide should be oxygen for satisfactory results.

The most desirable results are obtained, according to the present invention, when the linear polyamides which are subjected to the heat-oxygen treatment have molecules which are of fairly high average molecular weights. The molecular weight of a polyamide may be expressed as a function of the intrinsic viscosity of the polymer, and it is advantageous that the polyamides treated according to present invention have an intrinsic viscosity in a suitable solvent, such as m-cresol, of at least about 0.1. The intrinsic viscosity may be determined from the formula:

$$V_i = \frac{\log_e V}{C}$$

where V is the viscosity of a fairly dilute solution of the polyamide divided by the viscosity of the solvent in the same units and at the same temperature, and C is the concentration in grams of the polyamide per 100 cc. of the solution. Even better results are obtained if the intrinsic viscosity of the material is above about 0.4. In crystalline linear polyamides an intrinsic viscosity of this magnitude indicates a molecular weight at about which cold drawing begins.

The present invention relates to heat-oxygen treated saturated linear polyamides, i. e., those substantially free of non-benzenoid unsaturation. The linear molecules of such saturated polyamides may be of various forms. Thus, they may be straight aliphatic chains or contain side chain substituents connected to either of, or to both, the carbon and the nitrogen atoms. Such substituted polyamides, in general, are less crystalline than the unsubstituted polyamides. The linear molecules may contain in their chains hetero atoms, such as oxygen or sulfur atoms, with or without substituting groups. It is, however, advantageous to employ straight aliphatic chain polyamides since the improved polyamides of the present invention produced therefrom are of exceptional toughness, flexibility and aging resistance.

In forming an improved polyamide of the type contemplated by the invention by exposure to heat and gaseous oxygen of a liquified suitable linear polyamide, the thickness of the body of the polyamide thus exposed is important. In general, a thickness of not over about 1/64 of an inch should be employed and advantageous results are provided when the thickness is on the order of one mil or less. The present invention, therefore, lends itself particularly advantageously to the production of films, such as coatings or sheets, of advantageous properties.

The thickness of the body of the polyamide exposed to heat and oxygen is limited since the heterogeneous reaction which occurs is a diffusion reaction. Under the influence of the heat oxygen molecules penetrate the surface of the mass of the polyamide and cause changes in the molecular structure thereof. The portions of the polyamide nearest the surface are first affected and converted and subsequent oxygen molecules must penetrate such converted portions to reach the more inner portions. If the thickness of the body is too great, the oxygen molecules cannot penetrate into the innermost portions to completely treat the mass of the polyamide within a reasonable time and without decomposition of the outermost surfaces.

The desirable properties of linear polyamides which have been treated according to the present invention are due to the fact that the heat-oxygen treatment causes cross-linkages to occur between adjacent long-chain molecules thereof. It appears that most, if not all, of the cross-linkages are in the vicinity of the amide linkages of the molecules; that is, it appears that in each of several amide linkages in a molecule either a nitrogen atom or a carbon atom adjacent thereto is linked to a nitrogen atom or to a carbon atom adjacent to a nitrogen atom in an adjacent long-chain molecule. The linkages are not imide linkages and contain no carbon atoms other than those in the linear molecules. The linkages are probably direct, but may be through oxygen. The long-chain molecules of polyamides of the present invention are thus connected together by cross-linkages to form a complex network the number of such linkages being determined by the nature and intensity of the heat-oxygen treatment to which the material was exposed.

Since the molecules of a polyamide of the present invention are thus interconnected, the material is substantially infusible and insoluble. For example, such a polyamide which was initially crystalline before treatment and which subsequent to treatment is still crystalline is opaque at room temperatures because of its crystallinity. As the temperature of the heat-oxygen treated polyamide is raised, no change occurs until a certain temperature is attained at which the polyamide becomes transparent. Upon subsequent cooling, it again becomes opaque. The change from opacity to transparency on heating occurs because the polyamide is no longer crystalline at the elevated temperature. Further heating of the polyamide in its transparent state does not cause it to melt or flow; indeed, if the heating is sufficiently intense, the polyamide will decompose without melting. An initially substantially non-crystalline polyamide which is converted according to the present invention into a tough, elastic mass will not melt upon being heated but if heated to a sufficient temperature will also decompose without melting.

Linear cross-linked polyamides of the invention are substantially insoluble in all common solvents. That is, although upon exposure to a solvent certain materials may in some cases be extracted from the polyamides, the mass of the polyamide is largely, if not entirely, unaffected, since the cross-linking of the molecules thereof prevents the disintegration into molecules necessary for a true solution.

A polyamide which, prior to treatment according to the present invention, is substantially crystalline at room temperatures still is largely crystalline after heat-oxygen treatment and, therefore, has the strength associated with the presence of crystallized linear molecules. The crystals, however, are small and are contained in a matrix of amorphous material, and the cross-linkages between the molecules tend to keep such crystals small. Even prolonged heating of the kind which with ordinary crystalline linear polyamides causes embrittlement does not cause the crystals of the improved polyamide of the invention to increase in size and cause embrittlement, with a consequent loss of flexibility and toughness of the polyamide. The resistance to aging at ordinary temperatures is even more pronounced. When the crystalline polyamide of the invention is employed as a coating or impregnant the cross-linking causes it to adhere tenaciously to its supporting material and even prolonged heating does not appreciably decrease such tenacity.

An initially substantially non-crystalline polyamide, or one of a low degree of crystallinity, which has been heat-oxygen treated according to the present invention is converted into a tough, rubber-like mass which is generally non-crystalline also. This apparently occurs because the cross-linkages between long-chain molecules cause gelation of the polyamide. Such improved polyamides may have some crystals therein, depending upon the tendency of the material to crystallize prior to treatment according to the invention. Such material also has good resistance to aging at both ordinary and elevated temperatures and, when employed as a coating or impregnant, has good adherence to its supporting substance.

During the heating and exposure to oxygen according to the present invention, some decomposition of the polyamide occurs with a resultant tendency to shorten the molecular chains. In a suitable linear polyamide suitably treated according to the invention, this tendency is offset by or is relatively minor in comparison to the tendency of the molecules to increase in molecular weight due to building up of the molecules by cross-linking. The intensity of the heat-oxygen treatment, therefore, should be such that the cross-linking action is favored but should not be so great that harmful decomposition occurs. Yet, as has been indicated, a heat-oxygen treatment of considerable intensity is required to cause the cross-linking to occur, since the invention relates to more than a mere drying of the polyamide.

The polyamide should be in the liquid state while being treated in order to facilitate the cross-linking of the molecules which would otherwise be impeded if, for example, the polyamide contained crystals.

Because of its toughness, flexibility, aging resistance, abrasion resistance and because of the tenacity with which it adheres to a material to which it has been applied before being heat-oxygen treated, the improved polyamide of the present invention is useful for coating or impregnating materials. Because of these characteristics and its good electrical insulation properties, such polymeric material may be employed to particular advantage as an insulating material for electrical conductors. Thus, a bare metal conductor, such as wire, may be coated with a suitable linear polyamide according to a suitable conventional procedure for coating wires and then be advantageously exposed to the desired temperature and to oxygen, preferably before the polymer has had an opportunity to solidify. A continuous process may be very advantageously practiced according to which the conductor, such as wire, is continuously coated with a liquified polymer after which it is continuously passed into a suitable heating oven which heats it in air. One or more coatings may be readily applied to a wire in this manner. High speeds of coating may be obtained with resultant economies in manufacture.

A wire coated with a polyamide of the type contemplated by the invention is shown in the drawing. The coating, which has excellent electrical insulation and moisture-proofing properties, is tough, flexible, very resistant to abrasion, and has very good adherence to the wire. It does not appreciably lose its flexibility and become brittle even if exposed to the weather for considerable periods or even if heated to temperatures of as high as 120° C. for several days, wherefore its aging properties are excellent.

The preparation of linear polyamides of suitable molecular weights for treatment according to the present invention may be accomplished in any suitable manner. If the polymers are prepared by condensation of a diamine and dicarboxylic acid, or by condensation of two other bifunctional reactants having different reactive groups at the ends of the molecules, equimolecular or substantially equimolecular proportions should be employed to obtain long-chain molecules. When the polymer is prepared by condensation of two or more amino acids or the like, any proportions may be employed. The reactants are ordinarily prepared by heating them in a suitable container, such as a glass reaction vessel, under conditions such that the condensation is promoted. For example, removal of water vapor or other condensation by-products to promote the condensation may be accomplished by continuously bubbling a dry oxygen-free gas, such as nitrogen, or hydrogen, through the reaction mixture with or without application of reduced pressure. Alternatively, the water vapor may be removed by agitating the mixture at a reduced pressure so as to produce a greatly extended surface from which the condensation products can be removed. These or other expedients are required in order to attain molecular weights of the polyamide of the desired magnitude within a reasonable time. The presence of oxygen in the initial polymer-forming stage is undesirable since it will prevent attainment of the desired molecular weights. When the substance has reached the desired molecular weight, as is evidenced by a check of its intrinsic viscosity or by other means, it may be employed for forming films such as coatings or the like, which may be subsequently treated according to the present invention.

The following examples will illustrate materials and articles embodying the invention and methods of producing such materials and articles.

Example 1

Equimolecular proportions of hexamethylene diamine and adipic acid were heated together in a glass reaction vessel in the absence of oxygen to a temperature of approximately 270° C. for about 16 hours. A stream of oxygen-free hydrogen gas was passed through the molten mixture during the heating to remove the water vapor formed. At the end of the heating the polyhexamethylene adipamide polymer had an intrinsic viscosity in m-cresol of approximately 0.8. When solidified, the material was a cream-colored, microcrystalline solid melting at approximately 260° C. About 15 grams of this material was dissolved in 100 cc. of cresol to provide a mobile solution of the polyamide suitable for application to copper wire. By means of the applicator of a horizontal wire enamelling machine, operating on conventional principles, a coating of the polyamide was applied to No. 30 AWG copper wire. The wire was passed continuously through the applicator and then through an electrically heated oven approximately 6 feet long at a rate of about 30 feet per minute, the oven being heated to a temperature of about 400° C. A coating of approximately 0.3 mil average thickness was obtained in 4 passes of the wire through the apparatus. An ample supply of oxygen was provided by a forced draft of air through the oven at about 6 cubic feet per hour.

The coated wire had a cherry red color and was extremely tough and abrasion resistant. The coating was crystalline and sufficiently flexible to permit the wire to be bent around a mandrel of its own diameter without cracking, indicating that it had an elongation of at least 50 per cent. The hardness and abrasion resistance of the coated wire were compared with those of a standard sample of No. 30 AWG varnish enamel wire and were found to be greatly superior.

When under the same operating conditions air was excluded from the oven and nitrogen gas was passed therethrough, a coated wire was obtained the coating of which was colorless, very brittle, and very poorly adherent to the wire.

Example 2

In this example polyhexamethylene adipamide, prepared according to the procedure outlined in Example 1, of an intrinsic viscosity in cresol of 0.9 was dissolved in cresol to form a 20 per cent solution. The solution was diluted with high-flash naphtha of 13 per cent by weight. The resulting solution was employed in the apparatus of the type outlined in Example 1 to coat No. 30 AWG copper wire. The wire speed was 40.8 feet per minute and the oven temperature was 330° C., a coating of 0.65 mil thickness being obtained in 5 passes. The coating of the completed wire was of light brown color, showed greater than 50 per cent elongation and had a static breakdown of 2770 volts per mil (RMS). The abrasion resistance of the wire was tested by means of a sapphire having an edge of 3 mil radius of curvature which was pressed with increasing force against the coated wire as it was drawn past the edge, until the edge of the sapphire pierced the coating. The "scraper value" of the coated wire or pressure to cause failure of the coating was 385 grams per mil of coating thickness, while well baked varnish enamel wire of the same gauge and thickness has a scraper value of only 200 to 250 grams per mil. The heat-oxygen treated polyamide coating on the wire was crystalline. It was very tough and necked down the breaking of the wire, thus showing great adherence to the wire. The excellent aging characteristics of the coating were shown by the fact that after being heated in air at 120° for 12 days the coating still had more than 50 per cent elongation, while well processed varnished enamel wire drops from its initially low 35 per cent elongation to less than 16 per cent elongation in the same time under the same conditions.

Example 3

Hexamethylene diamine and sebacic acid in substantially equimolecular proportions were heated together in a glass reaction vessel at about 250° C. for approximately 16 hours, oxygen-free hydrogen being bubbled through the mass during the reaction to remove the water vapor formed. At the end of this time the material had a sufficiently high molecular weight to permit the molten mass to be formed into threads which could be cold drawn into oriented fibers. When the mass, polyhexamethylene sebacamide, was solidified after heating, it was a white, microcrystalline solid having a melting point of approximately 210° C. A solution of this compound was made by dissolving 40 grams in cresol and diluting the resulting solution with an equal volume of high-flush naphtha. The solution was employed to coat No. 40 AW copper wire by means of the horizontal enamelling machine described in Example 1. The wire was continuously passed through the applicator and oven at about 71 feet per minute, the oven temperature being 250° C. and a forced draft of air of about 6 cubic feet per hour being passed through the oven. In 4 passes of the wire through the apparatus, the diameter of the wire was increased by the coating by 0.3 mil. The finished coating film was crystalline in character. The coated wire was tested in mercury under 5 volts potential and showed ten defects per 100 feet, which is relatively few for such an extremely thin coating of insulation. The scraper value for this wire was much higher than that for similar wire coated with a varnish enamel coating of like thickness. The coated wire showed an elongation greater than 50 per cent when tested by the mandrel test described in Example 1. It was also found possible to solder this wire without scraping the insulation therefrom, as is necessary with other types of enamelled wires.

Example 4

Substantially equimolecular proportions of decamethylene diamine and sebacic acid were heated together in a glass vessel at about 250° C. with oxygen-free nitrogen being bubbled through the mass to remove the water vapor formed. After about 16 hours heating the mass was found to have an intrinsic viscosity of about 0.5 in cresol and after solidification was a white, microcrystalline solid melting sharply at about 195° C. This material, polydecamethylene sebacamide, was applied in its molten condition to No. 22 AWG tinned copper wire by means of enamelling apparatus of the character described in Example 1. A 29 mil diameter die was employed to strip off excess of the melted polyamide. The molten polyamide in the apparatus was maintained in a closed reservoir under nitrogen at 250° C.–260° C. The coating of the polyamide of approximately 2 mills thickness was allowed to solidify in air on the wire, which was then coiled up. The wire was subsequently subjected to a temperature of about 450° C. in air for about one minute while it was maintained in a vertical position. The coating was converted by this treatment into a substantially infusible, insoluble, crystalline, brownish film. The wire so treated was tested in comparison with a like portion of the untreated wire by aging in an oven at 130° C. for 24 hours. The untreated wire became excessively brittle losing adhesion to the conductor even upon slight bending, whereas the heat-oxygen treated coating adhered tenaciously to the wire even through it was bent around a mandrel of its own diameter. The toughness and abrasion resistance of the coating were also extremely good.

Example 5

Sebacic acid and ethylene diamine were reacted in alcohol solution until a neutral reaction was obtained with bromo-thymol-blue, the purified salt resulting from the reaction being heated at about 250° C. in a stream of inert oxygen-free gas until the intrinsic viscosity in cresol was approximately 0.3. The polyethylene sebacamide so formed was a hard, brittle microcrystalline solid melting at about 260° C. A solution of 10 grams of this material in 50 cc. of cresol was employed to form a film about 0.5 mil thick on copper foil, the film being heated in air at about 300° C. for about one minute. A dark red, flexible, tough, adherent, infusible crystalline coating was obtained. A sample of the coated material was tested by immersion in water at room temperature for adhesion and solubility. Immersion for over 3 weeks caused no significant change in properties.

Example 6

Omega-amino undecanoic acid was converted into a polyamide by heating a suitable amount of it at a temperature of about 250° C. for 14 hours in a stream of hydrogen gas. The average molecular weight of the polyamide at this stage was sufficiently high to permit it to be cold drawn into strong oriented fibers. In this case, however, a film of the polyamide was formed on a steel plate by spreading the molten polyamide to a thickness of approximately 2 mils and heating it in air to about 250° C. for several minutes. A very tough, insoluble, infusible, adherent, crystalline coating was obtained having good electrical insulating properties.

Example 7

A suitable amount of N-cyclohexyl-11-amino undecanoic acid was heated at about 250° C. in a stream of hydrogen gas for about 7 days. A tacky, resinous mass was formed having an intrinsic viscosity in cresol greater than 0.1. A film of 0.5 mil thick was formed on glass from a 15 per cent solution by weight of the polyamide in chloroform, the liquified film being then subjected to a temperature of about 160° C. for about 10 minutes. The resulting heat-oxygen treated film was tough, infusible, insoluble and substantially non-crystalline.

Example 8

A polyamide was formed by reacting at about 250° C. 7.2 grams of N,N′ dimethyl hexamethylene diamine with 7.3 grams of adipic acid in a stream of hydrogen gas for 3 days. The poly N,N′ dimethyl hexamethylene adipamide so obtained was a sticky, viscous liquid having a molecular weight sufficiently great to cause the polyamide to have an intrinic viscosity in m-cresol of considerably over 0.3. A solution of 5 grams of the polyamide in 50 cc. of chloroform was employed to form on a copper foil a film 0.5 mil thick. The film was heated in air at a temperature between about 250° C. and about 350° C. for 2 minutes. A rubber-like, infusible, tough, substantially noncrystalline film which adhered strongly to the metal foil was formed. When tested in chloroform the film proved to be insoluble.

Example 9

Poly N,N′ dimethyl hexamethylene adipamide as prepared in the preceding example was dissolved in chloroform to form a 10 per cent solution by weight. A length of No. 22 AWG copper wire insulated with two servings of cotton yarn was impregnated with said solution. The impregnated wire was dried at 60° C. and subjected to a temperature of 130° C. for 10 minutes in air. The wire showed improved insulation resistance and abrasion resistance as compared with the untreated wire. A portion of the wire was tested for burning and proved considerably more flame resistant than the unimpregnated wire.

Example 10

Approximately equimolecular proportions of hexamethylene diamine, decamethylene diamine, sebacic acid and adipic acid were heated in a stream of hydrogen gas at 250° C. for 24 hours. The interpolyamide so obtained was a tough, flexible solid which melted at about 150° C. About 20 grams of this material was dissolved in about 100 cc. of hot butyl Cellosolve. The solution was diluted to approximately 10 per cent solids with butyl alcohol and cooled. An emulsion was formed which was applied to No. 31 AWG copper wire by means of the enamelling appartus described in Example 1. The wire was passed through the applicator and oven at a speed of 25 feet per minute, a temperature of 320° C. being employed in the oven. The thickness of the coating was 0.2 mil. The coated wire was brown in color, and the crystalline coating was tough, flexible, adherent and very resistant to aging. The coating also showed remarkable resistance to scraping when tested with the sapphire device described above, indicating that the coating had exceptional abrasion resistance qualities.

Example 11

One mol of sebacic acid, 0.5 mol of propylene diamine, and 0.55 mol of ethylene glycol were reacted at about 250° C. for 22 hours in a stream of inert oxygen-free gas. The polyesterpolyamide so obtained was hard and tough, and was capable of being drawn into strong oriented fibers, its intrinsic viscosity in cresol being in the neighborhood of 0.4. Of the sum of the ester and amide linkages in the linear molecules in this polyesterpolyamide approximately 50 per cent were amide linkages. A solution of this polymer was prepared by dissolving 20 grams of this substance in about 100 cc. of cresol and diluting to about 14 per cent solids with more cresol. The resulting solution was applied to No. 31 AWG copper wire in a continuous manner by means of the apparatus described in Example 1. A speed of 25 feet per minute of the wire and an oven temperature of 320° C. were employed, air being supplied to the oven at the rate of about 6 cubic feet per hour.

The resulting crystalline coating was 0.4 mil thick and was tough, flexible, abrasion resistant and of good adherence. The wire coated with this material could be bent around a mandrel of the diameter of the wire without cracking, indicating that the coating had an elongation greater than 50 per cent. It retained this elongation even on prolonged heating in the neighborhood of 100° C.

As indicated by the above examples, the polyamide may be formed into a film, such as a coating, either from a solution or from the molten state. When initially subjected to the heat the polyamide may be in the liquid state or it may be in the solid state and be liquified by the heat, so that in either case the liquid state desirable for efficient heat-oxygen treatment is present. While in each of these examples the polyamide is employed as a coating or impregnant, it is possible to form sheets of the polyamide of the present invention, as by spreading a suitable liquified polyamide on a suitable surface of such a character that the film of polyamide will not adhere to the surface and heat-oxygen treating the polyamide according to the invention. In any case where the polyamide is employed in the form of a film, coating, or impregnant and it is desired to convert the entire polyamide into an infusible, insoluble mass by exposure to heat and gaseous oxygen, care should be taken that the thickness of the impregnated polyamide is not too great to prevent penetration of the oxygen to the innermost portions of the polyamide.

In the practice of the present invention, driers such as cobalt resinate, lead linoleate or cobalt naphthenate may be added to the polyamide or to the solution of the polyamide to accelerate the heat-oxygen treatment.

As has been indicated by Example 11, the invention may be employed not only in connection with polymers the molecules of which contain in the chain only amide linkages between the repeating units, but also in connection with polymers the molecules of which contain in the chain other kinds of linkages besides amide linkages. At least 50 per cent of the molecular chain linkages, however, should be amide linkages in order that the cross-linking in the vicinity of the amide linkages which provide the desirable properties of the materials in the present invention may occur. The number and kind of linkages other than the amide linkages in the molecules should be such that they do not cause harmful degradation or decomposition of the polymer on being subjected to the heat-oxygen treatment. In the appended claims the term "polyamide" is intended to include, besides polymers containing only amide linages, polymers containing other linkages besides amide linkages.

In the appended claims, moreover, the term "substantially crystalline" as applied to an unconverted polyamide is intended to mean that the polyamide if solidified is substantially crystalline at room temperature.

It is apparent that the above-described examples of the invention are illustrative and that modifications may be made therein, and that the invention may be employed in other connections than those indicated without departing from the spirit of the invention. It is intended that the patent shall include, by suitable expression in the appended claims, what other features of novelty reside in the invention.

What is claimed is:

1. A body of thin cross section comprising a baked heat-darkened, tough, flexible, substantially infusible polyamide produced by heating in the presence of oxygen a body of thin cross section of a synthetic, saturated, linear polyamide identical with the condensation reaction product of a polymer-forming composition comprising reacting materials selected from the class consisting of (a) polymerizable saturated monoamino monocarboxylic acids and (b) mixtures of saturated diamines and saturated dibasic carboxylic acids, which polyamide has linear molecules of an average molecular weight corresponding to an intrinsic viscosity of at least about 0.1, said heating in the presence of oxygen being conducted for a short time at a temperature above the melting point of said linear polyamide and lying between about 125° C. and about 450° C. and being sufficient to darken said linear polyamide and to render it infusible but insufficient to decompose said linear polyamide until it becomes black in color.

2. An article including a body portion having adhering thereto a thin coating comprising a baked, heat-darkened, tough, flexible, substantially infusible polyamide produced by heating in the presence of oxygen a thin coating in place on said body of a synthetic, saturated, linear polyamide identical with the condensation reaction product of a polymer-forming composition comprising reacting materials selected from the class consisting of (a) polymerizable saturated monoamino monocarboxylic acids and (b) mixtures of saturated diamines and saturated dibasic carboxylic acids, which polyamide has linear molecules of an average molecular weight corresponding to an intrinsic viscosity of at least about 0.1, said heating in the presence of oxygen being conducted for a short time at a temperature above the melting point of said linear polyamide and lying between about 125° C. and about 450° C. and being sufficient to darken said linear polyamide and to render it infusible but insufficient to decompose said linear polyamide until it becomes black in color.

3. A thin film comprising a baked, heat-darkened, tough, flexible, substantially infusible polyamide produced by heating in the presence of oxygen a body of thin cross section of a synthetic, saturated, linear polyamide identical with the condensation reaction product of a polymer-forming composition comprising reacting materials selected from the class consisting of (a) polymerizable saturated monoamino monocarboxylic acids and (b) mixtures of saturated diamines and saturated dibasic carboxylic acids, which polyamide has linear molecules of an average molecular weight corresponding to an intrinsic viscosity of at least about 0.1, said heating in the presence of oxygen being conducted for a short time at a temperature above the melting point of said linear polyamide and lying between about 125° C. and about 450° C. and being sufficient to darken said linear polyamide and to render it infusible but insufficient to decompose said linear polyamide until it becomes black in color.

4. An electrical conductor having a covering layer which includes a baked, heat-darkened, tough, flexible. substantially infusible polyamide produced by heating in the presence of oxygen a body of thin cross section of a synthetic, saturated, linear polyamide identical with the condensation reaction product of a polymer-forming composition comprising reacting materials selected from the class consisting of (a) polymerizable saturated monoamino monocarboxylic acids and (b) mixtures of saturated diamines and saturated dibasic carboxylic acids, which polyamide has linear molecules of an average molecular weight corresponding to an intrinsic viscosity of at least about 0.1, said heating in the presence of oxygen being conducted for a short time at a temperature above the melting point of said linear polyamide and lying between about 125° C. and about 450° C. and being sufficient to darken said linear polyamide and to render it infusible but insufficient to decompose said linear polyamide until it becomes black in color.

5. An electrical conductor having adhering to the surface thereof a coating comprising a baked, heat-darkened, tough, flexible, substantially infusible polyamide of the kind described in claim 4.

6. A body of thin cross-section comprising a baked, heat-darkened, tough, flexible, substantially infusible, substantially crystalline polyamide material produced by heating in the presence of oxygen a body of thin cross-section consisting substantially entirely of synthetic, substantially crystalline, saturated, linear polyamide material the linear molecules of which are identical in structure with the linear molecules produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of at least about 0.1, said heating in the presence of oxygen being conducted for a short time at a temperature above the melting temperature of said linear polyamide material and lying between about 250° C. and about 450° C. and being sufficient to darken said linear polyamide material and to render it infusible but insufficient to decompose said polyamide material until it becomes black in color.

7. A body of thin cross-section of claim 6 in which the infusible polyamide material is produced by heating to the extent described in said claim synthetic, substantially crystalline, saturated, linear polyamide material of the kind described in said claim, having linear molecules of an average weight corresponding to an intrinsic viscosity of about 0.4, the heating in the presence of oxygen being conducted at a temperature above the melting point of said polyamide and lying between about 325° C. and about 450° C.

8. An article including a body portion having adhering thereto a thin coating comprising a baked, heat-darkened, tough, flexible, substantially infusible, substantially crystalline polyamide material produced by heating in place on said body in the presence of oxygen a coating consisting substantially entirely of synthetic, substantially crystalline, saturated, linear polyamide material the linear molecules of which are identical in structure with the molecules produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of about 0.1, said heating in the presence of oxygen being conducted for a short time at a temperature above the melting point of said linear polyamide material and lying between about 250° C. and about 450° C. and being sufficient to darken said linear polyamide material and to render it infusible but insufficient to decompose said polyamide material until it becomes black in color.

9. An electrical conductor having a covering layer which includes a baked, heat-darkened, tough, flexible, substantially infusible, substantially crystalline polyamide material produced by heating in the presence of oxygen a body of thin cross-section consisting substantially entirely of synthetic, substantially crystalline, saturated, linear polyamide material the linear molecules of which are identical in structure with the linear molecules produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of at least about 0.1, said heating in the presence of oxygen being conducted for a short time at a temperature above the melting point of said linear polyamide material and lying between about 250° C. and about 450° C. and being sufficient to darken said linear polyamide material and to render it infusible but insufficient to decompose said polyamide material until it becomes black in color.

10. A body of thin cross-section comprising a baked, heat-darkened, tough, rubber-like, substantially infusible, substantially non-crystalline polyamide produced by heating in the presence of oxygen a body of thin cross-section consisting substantially entirely of synthetic, substantially non-crystalline, saturated, linear polyamide material the linear molecules of which are identical in structure with the linear molecules produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of about 0.1, said heating in the presence of oxygen being conducted for a short time at a temperature above the melting point of said linear polyamide material and lying between about 125° C. and 450° C. and being sufficient to darken said linear polyamide material and to render it infusible but insufficient to decompose said polyamide material until it becomes black in color.

11. A thin film comprising a baked, heat-darkened, tough, elastic, substantially infusible, substantially non-crystalline polyamide material produced by heating in the presence of oxygen a body of thin cross-section consisting substantially entirely of synthetic, substantially non-crystalline, saturated, linear polyamide material the linear molecules of which are identical in structure with the linear molecules produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to the intrinsic viscosity of at least about 0.1, said heating in the presence of oxygen being conducted for a short time at a temperature above the melting point of said linear polyamide material and lying between about 125° C. and about 450° C. and being sufficient to darken said linear polyamide material and to render it infusible but insufficient to decompose said polyamide material until it becomes black in color.

12. An article including a body portion having adhering thereto a thin coating comprising a baked, heat-darkened, tough elastic, substantially infusible, substantially non-crystalline polyamide material produced by heating in place on said body in the presence of oxygen a thin coating consisting substantially entirely of synthetic, substantially non-crystalline, saturated, linear polyamide material the linear molecules of which are identical in structure with the linear molecules produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of at least about 0.1, said heating in the presence of oxygen being conducted for a short time at a temperature above the melting point of said linear polyamide material and lying between about 125° C. and about 450° C. and being sufficient to darken said linear polyamide material and to render it infusible but insufficient to decompose said polyamide material until it becomes black in color.

13. An electrical conductor having a covering layer which includes a baked, heat darkened, tough, elastic, substantially non-crystalline polyamide material produced by heating in the presence of oxygen a body of thin cross-section consisting substantially entirely of synthetic, substantially non-crystalline, saturated, linear polyamide material the linear molecules of which are identical in structure with the linear molecules produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of at least about 0.1, said heating in the presence of oxygen being conducted for a short time at a temperature above the melting point of said linear polyamide material and lying between about 125° C. and about 450° C. and being sufficient to darken said linear polyamide material and to render it infusible but insufficient to decompose said polyamide material until it becomes black in color.

14. The method of producing a body of thin cross section of a baked, heat-darkened, tough, flexible, substantially infusible, substantially crystalline polyamide comprising heating in the presence of oxygen a body of thin cross section of a synthetic, saturated, linear polyamide identical with the condensation reaction product of a polymer-forming composition comprising reacting materials selected from the class consisting of (a) polymerizable, saturated monoamino monocarboxylic acids and (b) mixtures of saturated diamines and saturated dibasic carboxylic acids, which polyamide has linear molecules of an average molecular weight corresponding to an intrinsic viscosity of at least 0.1 said heating in the presence of oxygen being conducted for a short time at a temperature above the melting point of said linear polyamide and lying between about 125° C. and about 450° C. and being sufficient to darken said linear polyamide and to render it infusible but insufficient to decompose said linear polyamide until it becomes black in color.

15. The method of producing a body of thin cross-section comprising a baked, heat-darkened, tough, flexible, substantially infusible, substantially crystalline polyamide material comprising heating in the presence of oxygen a body of thin cross-section consisting substantially entirely of synthetic, substantially crystalline, saturated, linear polyamide material, the molecules of which are identical in structure with those produced by condensation reaction of a poly-forming composition comprising reacting material selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of at least about 0.1, said heating in the presence of oxygen being conducted for a short time at a temperature above the melting point of said linear polyamide material and lying between about 250° C. and about 450° C. and being sufficient to darken said linear polyamide material and to render it infusible, but insufficient to decompose said polyamide material until it becomes black in color 16. The method of claim 15 in which said synthetic, substantially crystalline, saturated, linear condensation polyamide material which is heated has linear molecules of an average molecular weight corresponding to an intrinsic viscosity of at least about 0.4, and is heated in the presence of oxygen to the extent indicated in said claim at a temperature lying between about 325° C. and about 450° C.

17. The method of producing a body of thin cross-section comprising a baked, heat-darkened, tough, rubber-like, substantially non-crystalline polyamide material comprising heating in the presence of oxygen a body of thin cross-section consisting substantially entirely of a synthetic, substantially non-crystalline, saturated, linear polyamide material the linear molecules of which are identical in structure with those produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of at least about 0.1, said heating in the presence of oxygen being conducted for a short time at a temperature above the melting point of said linear polyamide material and lying between about 125° C. and about 450° C. and being sufficient to darken said linear polyamide material and to render it infusible but insufficient to decompose said polyamide material until it becomes black in color.

18. The method of coating an electrical conductor comprising applying to the conductor a thin coating consisting substantially entirely of a synthetic, saturated, linear polyamide material the linear molecules of which are identical in structure with those produced by condensation reaction of a polymer-forming composition comprising reacting materials selected from the class consisting of (a) polymerizable saturated monoamino monocarboxylic acids and (b) mixtures of saturated diamines and saturated dibasic carboxylic acids, which linear molecules are of an average molecular weight corresponding to an intrinsic viscosity of at least about 0.1, and heating said coating in place on said conductor for a short time in the presence of oxygen at a temperature above the melting point of said linear polyamide material and lying between about 125° C. and about 450° C., said heating being sufficient to darken said linear polyamide material and to render it infusible, but insufficient to decompose said polyamide material until it becomes black in color.

CALVIN S. FULLER.